UNITED STATES PATENT OFFICE.

JOHN MILLER, OF SEATTLE, WASHINGTON, ASSIGNOR OF ONE-FOURTH TO NELS KRANTZ AND ONE-FOURTH TO HANSENE KRANTZ, BOTH OF KING COUNTY, WASHINGTON.

PROCESS FOR MANUFACTURING FUEL.

1,241,648.  Specification of Letters Patent.  Patented Oct. 2, 1917.

No Drawing.  Application filed April 18, 1916. Serial No. 91,852.

*To all whom it may concern:*

Be it known that I, JOHN MILLER, a citizen of the United States, and a resident of Seattle, in the county of King and State of Washington, have invented certain new and useful Improvements in Processes for Manufacturing Fuel, of which the following is a full, true, and exact specification.

My invention relates to a process for manufacturing fuel and has for its principal object; to provide a new and improved process for manufacturing a cheap and convenient fuel from waste animal or vegetable matter by admixing with a binder.

Much refuse is wasted ordinarily which if properly combined and prepared, will make an excellent fuel. My process may be carried on on a large scale or may be a house-hold process.

My process consists in drying any form of animal or vegetable refuse matter which is combustible, such as vegetable, parings or refuse wood, grinding the dry refuse to an approximately uniform size. The refuse is mixed with crude oil, mineral or vegetable pitch, rosin, charcoal and gasolene or coal oil in the approximate proportions of fifty per cent. waste and twenty per cent. crude oil, twenty per cent. pitch and ten per cent. of the rosin, charcoal and gasolene combined. The ingredients are mixed together either cold or hot and when thoroughly mixed, are formed into a convenient size of fuel, preferably under pressure. The function of the charcoal and coal oil or gasolene are to bring the mass to a proper consistency, and may be omitted if consistence is proper without them.

What I claim is:

The herein described process of manufacturing fuel, consisting in drying combustible refuse, grinding the dried refuse into particles of substantially uniform size, adding to fifty per cent. of the dried ground refuse while in a heated state twenty per cent. of crude oil, twenty per cent. of pitch and ten per cent. of a mixture of rosin, charcoal and gasolene, and then molding the mixture in blocks.

JOHN MILLER.

Copies of this patent may be obtained for five cents each, by addressing the "Commissioner of Patents, Washington, D. C."